United States Patent
Deckers et al.

(10) Patent No.: US 6,762,254 B1
(45) Date of Patent: Jul. 13, 2004

(54) ETHYLENE(METH)ACRYLATE COPOLYMERS WITH LOW RESIDUAL CONTENT IN COMONOMERS

(75) Inventors: Andreas Deckers, Flomborn (DE); Wilhelm Weber, Neustadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/959,800

(22) PCT Filed: May 3, 2000

(86) PCT No.: PCT/EP00/03969
§ 371 (c)(1),
(2), (4) Date: Nov. 7, 2001

(87) PCT Pub. No.: WO00/69929
PCT Pub. Date: Nov. 23, 2000

(30) Foreign Application Priority Data

May 17, 1999  (DE) ......................... 199 22 104

(51) Int. Cl.$^7$ .................................. C08F 2/00
(52) U.S. Cl. .............................. 526/64; 526/65; 526/66; 526/73; 526/227; 526/319; 526/348.2; 526/348.5; 526/348.6
(58) Field of Search .............. 526/64, 65, 66, 526/73, 227, 319, 348.2, 348.5, 348.6

(56) References Cited

U.S. PATENT DOCUMENTS

| | | | | |
|---|---|---|---|---|
| 3,875,134 A | * | 4/1975 | Morikawa et al. ............ | 526/64 |
| 4,525,546 A | * | 6/1985 | Fukawa et al. ............... | 526/68 |
| 4,537,954 A | * | 8/1985 | Ando et al. .................. | 528/481 |
| 5,376,739 A | * | 12/1994 | Pfleger et al. ................ | 526/64 |
| 5,449,724 A | * | 9/1995 | Moffat et al. ............... | 526/204 |
| 5,736,739 A | * | 4/1998 | Uber et al. .................. | 250/287 |
| 5,883,186 A | | 3/1999 | Gottschalk et al. | |
| 5,994,457 A | | 11/1999 | Stanger et al. | |

FOREIGN PATENT DOCUMENTS

| | | |
|---|---|---|
| CA | 2204677 | 11/1997 |
| DE | 32 34 492 | 3/1984 |
| DE | 32 33 391 | 4/1984 |
| DE | 34 34 380 | 3/1986 |
| DE | 196 01330 | 7/1997 |
| EP | 175 316 | 3/1986 |
| GB | 932231 | * 7/1963 |
| GB | 1205635 | * 9/1970 |

OTHER PUBLICATIONS

Ethylene Polymers; Encyclopedia of Polymer Science and Engineering, vol. 6, p. 404ff.

* cited by examiner

*Primary Examiner*—Tatyana Zalukaeva
(74) *Attorney, Agent, or Firm*—Keil & Weinkauf

(57) ABSTRACT

Copolymers of ethylene have from 1 to 30 mol % of alkyl(meth)acrylates and, if desired, other comonomers, and have a residual comonomer content of less than 0.5% by weight in the copolymer. A process for preparing copolymers of this type in a combination of stirred autoclave and tubular reactor is described, as is the use of the copolymers for preparing polyamide molding compositions.

9 Claims, No Drawings

ETHYLENE(METH)ACRYLATE COPOLYMERS WITH LOW RESIDUAL CONTENT IN COMONOMERS

The present invention relates to copolymers of ethylene having from 1 to 30 mol % of alkyl(meth)acrylates and, if desired, other comonomers, and having a residual comonomer content of less than. 0.5% by weight in the copolymer. It also relates to a process for preparing copolymers of this type in a combination of stirred autoclave and tubular reactor, and also to the use of the copolymers for preparing polyamide molding compositions.

Copolymers of ethylene with (meth)acrylates and/or (meth)acrylic acid are in principle known. For example, DE-A 32 34 492, DE-A 32 38 391 and DE-A 34 34 380 disclose copolymers of this type with different makeups and property profiles. They are used in particular as an additive for preparing impact-modified polyamide-based molding compositions with good processability. Molding compositions of this type are used, for example, to produce gear wheels and electrical switches via injection molding. For this type of application of ethylene-(meth)acrylate copolymers it is important that the incorporation of the comonomers into the copolymer is highly homogeneous. Fractions of the polymer which are low in comonomer, i.e. composed primarily of ethylene units, have an adverse effect on the properties of the resultant polyamide molding compositions, for example reducing their impact strength.

An important requirement placed upon ethylene-(meth) acrylate copolymers is a very low residual content of comonomers. Commercially available products comprise more than 0.5% by weight of free comonomers. When the polyamide molding composition is heated to the usual injection-molding temperatures of from 250 to 35 350° C., this comonomer content evaporates and passes into the atmosphere. This causes undesirable odor in the workplace, and there may also be some degree of occupational health risk.

However, it is difficult to remove comonomers completely from the reaction product. Ethylene-(meth)acrylate copolymers are usually prepared by high-pressure polymerization in stirred autoclaves or tubular reactors (cf., for example, "Ethylene Polymers" in Encyclopedia of Polymer Science and Engineering, Vol. 6, pp. 404 et seq.) or in a combination of both, as disclosed in EP-A 175 316. Depending on the type of reactor, the conversion here is up to 30% (stirred autoclave) or up to 35% (tubular reactor). Although (meth)acrylate monomers are more reactive than ethylene and are therefore favored for incorporation into the polymer during the polymerization, there are also unreacted comonomers in the polymer. Whereas any unreacted content of highly volatile ethylene can readily be removed in the product separation systems, unreacted content of higher-boiling comonomers, such as butyl acrylate, cannot be removed completely under these conditions, and they remain in the product. Even post-treatment with a stripping medium, such as $N_2$, cannot remove them completely. None of the publications cited above discloses low-comonomer ethylene-(meth)acrylate copolymers or measures which can be used to reduce the residual comonomer content.

It is an object of the present invention to provide ethylene-(meth)acrylate copolymers with low residual comonomer content, and also a cost-effective process for preparing polymers of this type.

We have found that this object is achieved by means of copolymers of ethylene having from 1 to 30 mol % of alkyl(meth)acrylate and, if desired, other comonomers, and having a residual comonomer content of less than 0.5% by weight in the copolymer. A process for preparing copolymers of this type in a combination of stirred autoclave and downstream tubular reactor has been found, as has the use of the copolymers for preparing polyamide molding compositions.

The novel copolymers of ethylene incorporate from 1 to 30 mol %, preferably from 2 to 20 mol %, of alkyl(meth) acrylate comonomers in the polymer. Particularly suitable alkyl(meth)acrylates are (meth)acrylates of linear or branched $C_1$–$C_8$ alcohols. Examples of suitable esters are methyl(meth)acrylate, butyl(meth)acrylate, 2-ethylhexyl (meth)acrylate and tert-butyl(meth)acrylate. Butyl acrylate is very particularly suitable. It is also possible to incorporate a variety of alkyl(meth)acrylates into the polymer.

If desired, other comonomers may also be incorporated into the novel copolymers. Possible other comonomers are any of those which can be copolymerized with ethylene, in particular monoethylenically unsaturated comonomers. Examples of suitable comonomers are monoethylenically unsaturated carboxylic acids and derivatives of these, in particular acrylic, methacrylic, maleic and fumaric acid, amides, N-alkyl- or N,N'-dialkylamides of unsaturated carboxylic acids, for example (meth)acrylamide and N,N'-dimethyl(meth)acrylamide, mono- and diesters of maleic or fumaric acid, vinylcarboxylates, in particular esters of $C_1$–$C_6$ alkanecarboxylic acids, for example vinyl acetate, N-vinylformamide, N-vinylpyrrolidone, monoethylenically unsaturated alcohols, ketones, carbon monoxide, monomers containing epoxy groups and cyclic anhydrides. Particularly preferred other comonomers are acrylic acid and methacrylic acid.

The amount of other comonomers usually present is from 0 to 10 mol %, preferably from 1 to 5 mol %.

The novel copolymers comprise less than 0.5% by weight of unreacted comonomers, i.e. comonomers not incorporated into the copolymer. The proportion of unreacted comonomer is preferably less than 0.3% by weight.

The novel copolymers are preferably prepared by the novel process in a combination of a stirred autoclave with a downstream tubular reactor. Stirred autoclaves are pressure vessels provided with a stirrer for intensive mixing of the reactants. The length/diameter ratio is usually from 1 to 20. Tubular reactors are composed of pressure-tight tubes, usually bent into a serpentine shape, through which the material passes at high speeds. The connection between the two reactors may, for example, be a simple pressure-tight tubular connector. The length/diameter ratio is usually 5000 to 50,000. The copolymerization of the ethylene with (meth) acrylates and, if desired, other comonomers takes place at pressures of from 350 to 5000 bar, preferably from 1500 to 3000 bar.

The copolymerization of the ethylene with the (meth) acrylates and, if desired, other comonomers takes place in the presence of free-radical initiators. The initiators which can be used here are those which are also usually used for the homopolymerization of ethylene under high pressure, for example peroxides, hydroperoxides and azo compounds. Examples of this type of initiator are azobisisobutyronitrile, tert-butyl perpivalate, di-tert-butyl-peroxide, tert-butyl hydroperoxide, tert-butyl perbenzoate, tert-butyl perisononanoate, tert-butyl perneodecanoate, methyl isobutyl ketone peroxide and dilauroyl peroxide. It is also possible to use mixtures of a variety of initiators.

The molecular weight of the copolymers may be adjusted in a known manner, using regulators. Examples of suitable regulators are hydrogen, hydrocarbons, such as propane or propene, and carbonyl compounds, such as propionaldehyde, acetone or methyl ethyl ketone.

The copolymerization is usually carried out without any solvent. This does not exclude the presence of small amounts of inert solvents usually used as solvents for initiators, for example mineral oils.

The polymerization takes place in two stages. The first polymerization stage takes place in the stirred autoclave and the second stage takes place in the tubular reactor. The polymerization temperature is selected by the skilled worker as a function of the desired product properties and of the comonomers used and also of any other comonomers which may be used. However, a decisive factor in the process is that the temperature in the second stage is higher than in the first stage. The desired polymerization temperature is set in the first stage, and the temperature in the second stage is above this. For typical monomer combinations, such as ethylene/butyl acrylate/acrylic acid, the temperature in the first stage is preferably less than 200° C., and in the second stage it is greater than 200° C. The temperature is particularly preferably from 180 to 200° C. in the first stage and from 200 to 240° C. in the second stage. The residence times and flow rates in the reactors here are preferably set so that the actual polymerization takes place primarily in the stirred autoclave, and then in the tubular reactor it is only the residual fractions of (meth)acrylate monomers and of other monomers which complete their polymerization. Since the reaction conditions in the stirred autoclave are highly homogeneous, the resultant polymers are very uniform in nature. The conversion in the first stage is generally at least 95% by weight (based on the total weight of final product) and in the second stage it is not more than 5% by weight. If the conversion in the second stage is higher, the resultant ethylene polymers can be disadvantageously low in comonomer. The conversion in the second stage is preferably only from 0.1 to 1% by weight. In the second stage it is in particular the residual fractions of comonomers present which are consumed in the reaction. This is therefore a "chemical deodorization".

The novel process gives copolymers which have a residual comonomer content of less than 0.5% by weight, in particular less than 0.3% by weight, and which nevertheless have a highly uniform nature. They are therefore highly suitable additives for preparing polyamide molding compositions with outstanding impact strength. The polyamide molding compositions produce only a low level of undesirable odor in thermoplastic processing to give moldings.

The examples below are intended to describe the invention in more detail without limiting its scope.

The residual comonomer content was determined in each case by head-space chromatography.

EXAMPLE 1

The experiment was carried out in a combination of stirred autoclave and tubular reactor. The 35 l steel autoclave used had a length/diameter ratio of 15, and attached to this via a pipe was a heatable tubular reactor of length 400 m. Ethylene at a flow rate of 1400 kg/h was compressed to a pressure of 2300 bar. A pump was used here to meter 57 l of a mixture of 15% by weight of acrylic acid and 85% by weight of butyl acrylate into the suction side of the postcompressor, and brought, together with the ethylene, to reaction pressure. 5.4 l/h of a solution of 0.3 mol/l of tert-butyl perpivalate in isododecane were also injected into the autoclave, using an ultrahigh-pressure pump, in order to initiate the polymerization. The reaction temperature established in the stirred autoclave as a result of the heat of polymerization liberated was 185° C. The reaction mixture then flows into a tubular reactor temperature-controlled to 210° C.

The pressure on the reaction mixture was reduced in two stages after it had passed through the tubular reactor, and it was discharged with the aid of an extruder. Unconverted ethylene was recycled into the process.

The copolymer obtained had the following makeup:

| Monomers incorporated | Ethylene | 88.1 mol % |
|---|---|---|
| | n-butyl acrylate | 9.0 mol % |
| | acrylic acid | 2.9 mol % |
| | residual comonomer content* | 0.3% by weight |

*Residual content, based on the product, of comonomers not incorporated into the polymer.

EXAMPLE 2

The procedure was as in Example 1, except that the apparatus used had no downstream tubular reactor.

The copolymer obtained had the following makeup:

| Monomers incorporated | Ethylene | 88.0 mol % |
|---|---|---|
| | n-butyl acrylate | 9.1 mol % |
| | acrylic acid | 2.9 mol % |
| | residual comonomer content | 0.55% by weight |

EXAMPLE 3

The experiment was carried out in a stirred reactor as described in DE-A 34 34 380 Example 1.

The copolymer obtained had the following makeup:

| Monomers incorporated | Ethylene | 87.6 mol % |
|---|---|---|
| | n-butyl acrylate | 9.5 mol % |
| | acrylic acid | 2.9 mol % |
| | residual comonomer content | 0.5% by weight |

We claim:

1. A process for preparing copolymers of ethylene with from 1 to 30 mol % of (meth)acrylates and, optionally, with other comonomers, and a residual comonomer content of less than 0.5% by weight in the copolymer, which comprises carrying out the polymerization in a combination of stirred autoclave and downstream tubular reactor by first polymerizing the monomer mixture in a stirred autoclave in a first stage at a temperature less than 200° C.

then, in a second stage, continuing the polymerization in a tubular reactor at a temperature higher than 200° C. in the second stage, wherein the conversion in the first stage is at least 95% by weight based on the total weight of final product and the second stage is not more than 5% by weight.

2. A process as claimed in claim 1, wherein the temperature is from 180 to less than 200° C. in the first stage and up to 240° C. in the second stage.

3. The process of claim 1 wherein the conversion in the second stage is from 0.1 to 1% by weight.

4. The process of claim 1 wherein the residual comonomer content is less than 0.3% by weight.

5. The process of claim 2 which is carried out with sufficient acrylic acid as an additional comonomer to form a copolymer containing 1 to 5 mol % of acrylic acid.

6. The process of claim 5 herein the copolymer contains 2 to 20 mol % of (meth)acrylates.

7. The process of claim 6 wherein the copolymer contains about 9 mol % n-butyl acrylate, about 2.9 mol % acrylic acid and the residual comonomer content is 0.3% by weight.

8. The process of claim 7 wherein the first stage temperature is about 185° C. and the second stage temperature is about 210° C.

9. A process for preparing copolymers of ethylene with 9 mol % of n-butyl acrylate and 2.9 mol % acrylic acid, and containing a residual comonomer content of 0.3% by weight in the copolymer, which comprises carrying out the polymerization in a combination of stirred autoclave and downstream tubular reactor by first polymerizing the monomer mixture in a stirred autoclave in a first stage at a temperature of 185° C., and then, in a second stage, continuing the polymerization in a tubular reactor at a temperature of 210° C., and wherein the conversion in the first stage is at least 95% by weight based on the total weight of final product and the second stage it is not more than 5% by weight.

* * * * *